(12) United States Patent
Kwoka

(10) Patent No.: US 6,446,773 B2
(45) Date of Patent: Sep. 10, 2002

(54) VISCOUS COUPLING WITH SYMMETRIC FREEWHEELING ASSEMBLY

(75) Inventor: Georg Kwoka, Much (DE)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 09/725,777

(22) Filed: Nov. 29, 2000

(30) Foreign Application Priority Data

Dec. 30, 1999 (DE) .......................................... 199 63 651

(51) Int. Cl.$^7$ ................................................ F16D 35/00
(52) U.S. Cl. ...................... 192/35; 192/12 R; 192/48.3; 192/57; 192/103 R; 180/249
(58) Field of Search ................................. 192/35, 12 R, 192/48.3, 103 F, 103 R, 58.41, 57; 180/248, 249

(56) References Cited

U.S. PATENT DOCUMENTS 5,060,747 A * 10/1991 Eto .............................. 180/197
5,174,408 A * 12/1992 Hock .......................... 180/248
5,448,478 A * 9/1995 Eto .............................. 180/197

* cited by examiner

Primary Examiner—Saúl Rodriguez

(57) ABSTRACT

A viscous coupling having two rotatable parts in the form of a hub and a housing for the transmission of torque between the rotatable parts caused by a positive speed differential between the rotatable parts, which are supported inside one another, which are rotatable relative to one another around a common longitudinal axis, and which form an annular chamber which is filled with a highly viscous fluid and in which first coupling plates non-rotatably connected to the first one of the two rotatable parts, e.g. the hub, and second coupling plates non-rotatably connected to the second one of the rotatable parts, e.g. the housing, are arranged alternately in the longitudinal direction. There is provided a freewheeling assembly comprising two rings which, if torque flows in a first direction at a positive speed differential between the first rotatable part and the second rotatable part, has a locking effect in both directions of rotation of the two rings at least above a relative rotational acceleration, and which, if torque flows in a second direction at a negative speed differential between the first and second rotatable parts, has an unlocking effect in both directions of relative rotation of said first and second rotatable parts, the freewheeling assembly is effective between a selected one of the first and second rotatable parts and a plate carrier which carries at least part of the coupling plates of the selected one of the first and second rotatable parts.

14 Claims, 2 Drawing Sheets

VISCOUS COUPLING WITH SYMMETRIC FREEWHEELING ASSEMBLY

BACKGROUND OF THE INVENTION

Using viscous couplings in the driveline of a motor vehicle with a permanently driven first axle and a second axle which is driven when required, wherein the parts of the coupling are connected to an input end and an output end in a driveline for a second axle is known and constitutes the most frequent application. In particular, it is also known to combine the viscous coupling with a freewheeling assembly which has a locking effect if the input end leads relative to the output end and which has an unlocking effect if the output end leads relative to the input end; this applies to forward driving of the vehicle. The disadvantage is that when the vehicle reverses, i.e. when the direction of rotation is reversed, the freewheeling unit unlocks the viscous coupling and the second axle cannot be driven; even if there is no grip at all at the first axle, the second axle cannot be connected. To overcome this disadvantage, it was necessary to provide an additional switching device by means of which the freewheeling assembly is bridged again during reversing.

BRIEF SUMMARY OF THE INVENTION

The present invention is embodied in and carried out by a viscous coupling having two parts for the transmission of torque between a first and a second of said two parts, causes by a speed differential between said first and said second of said two parts, which two parts are supported inside one another, and which are rotatable relative to one another around a common longitudinal axis, and which form an annular chamber which is filled with a highly viscous fluid and in which first coupling plates are non-rotatably connected to the first one of the rotatable parts, e.g., the hub, and second coupling plates are non-rotatably connected to the second one of the rotatable parts, e.g., the housing, are arranged alternately in the longitudinal direction, and which, in the general rotational direction, i.e., if used in a vehicle during forward driving, carries out the functions of a freely switchable viscous coupling and which is lockable in the opposite rotational direction, i.e., when reversing if having slip at the first axle, without additional means.

The objective is achieved by providing a differential speed-dependent freewheeling assembly which, if torque flows in a first direction at a positive speed differential between the first and the second of said rotatable parts, has a locking effect in both directions of relative rotation of its rings at least above a relative rotational acceleration and which, if torque flows in a second direction at a negative speed differential between the first and the second of said rotatable parts, has an unlocking effect in both directions of rotation of its rings, and which freewheeling assembly is effective between the one of the parts which are rotatable relative to one another and a plate carrier which carries at least part of the coupling plates of this particular one of the parts which are rotatable relative to one another.

If only part of the coupling plates can be coupled to the respective rotatable part by means of the plate carrier, whereas the remaining coupling plates associated with that part are permanently and non-rotatably connected to same, the coupling, in the differential speed range starting with zero, initially comprises the characteristic curve of a conventional viscous coupling. When the second part of the coupling plates is connected by means of the plate carrier as a function of a minimum differential speed, it is possible, from a certain differential speed onwards, to change over to the characteristic curve of a correspondingly larger viscous coupling.

If the plate carrier is connected as a function of a certain relative rotational acceleration, the change-over from one characteristic curve to the other characteristic curve takes place independently of the absolute differential speed as a function of the rotational acceleration. If all coupling plates of the one of the parts which are rotatable relative to one another can be coupled to or uncoupled from that particular part by means of the plate carrier, there is no presence of the characteristics of the conventional viscous coupling, and the coupling as a whole can be connected either as a function of the differential speed or as a function of the rotational acceleration. The advantageous effect of this feature is that, during maneuvering, the inventive viscous coupling is not locked or only slightly locked and that the second driving axle is effectively coupled only if considerable slip occurs at the first driving axle. As a result, the driveline distortions to be avoided during maneuvering are not built up. This applies to forward driving and reversing.

When the torque flow is reversed, i.e. in the case of a negative speed differential (front axle being rolled over by the rear axle), the freewheeling unit unlocks without fail. This driving condition is realistically conceivable during forward driving only, i.e. when the first driving axle is blocked.

According to a special embodiment, the freewheeling assembly comprises locking members which are held in a cage which is brakeable (retainable) relative to the one of the parts rotatable relative to one another and which, when braked (retained) causes the freewheeling unit to be blocked. In this context, it is proposed in particular that the cage is connected to a brake plate which is positioned inside the sealed annular chamber and which adjoins a radial wall of the other one of the parts which are rotatable relative to one another. In the case of a slowly increasing speed differential between the coupling plates of the first part and the coupling plates connected to the plate carrier, the latter are driven at identical speeds. In the case of a suddenly increasing and/or upper speed differential, the plate of the cage with the adjoining wall of the other part stays behind relative to the one part, so that the freewheeling unit is blocked and the coupling carrier is coupled to the second part. In this way, the coupling becomes effective and changes to different characteristics.

The locking members of the freewheeling unit are positioned in a central position between ramp faces at the one of the two rings, whereas they co-operate with a centric annular face at the other one of the two rings. There are provided spring means which return the locking members in the circumferential direction into the non-locking central position.

BRIEF DESCRIPTION OF THE DRAWINGS

The present invention will be better understood if the written description thereof is read with reference to the accompanying drawings, of which.

DETAILED DESCRIPTION OF THE INVENTION

Figures 1, 2:
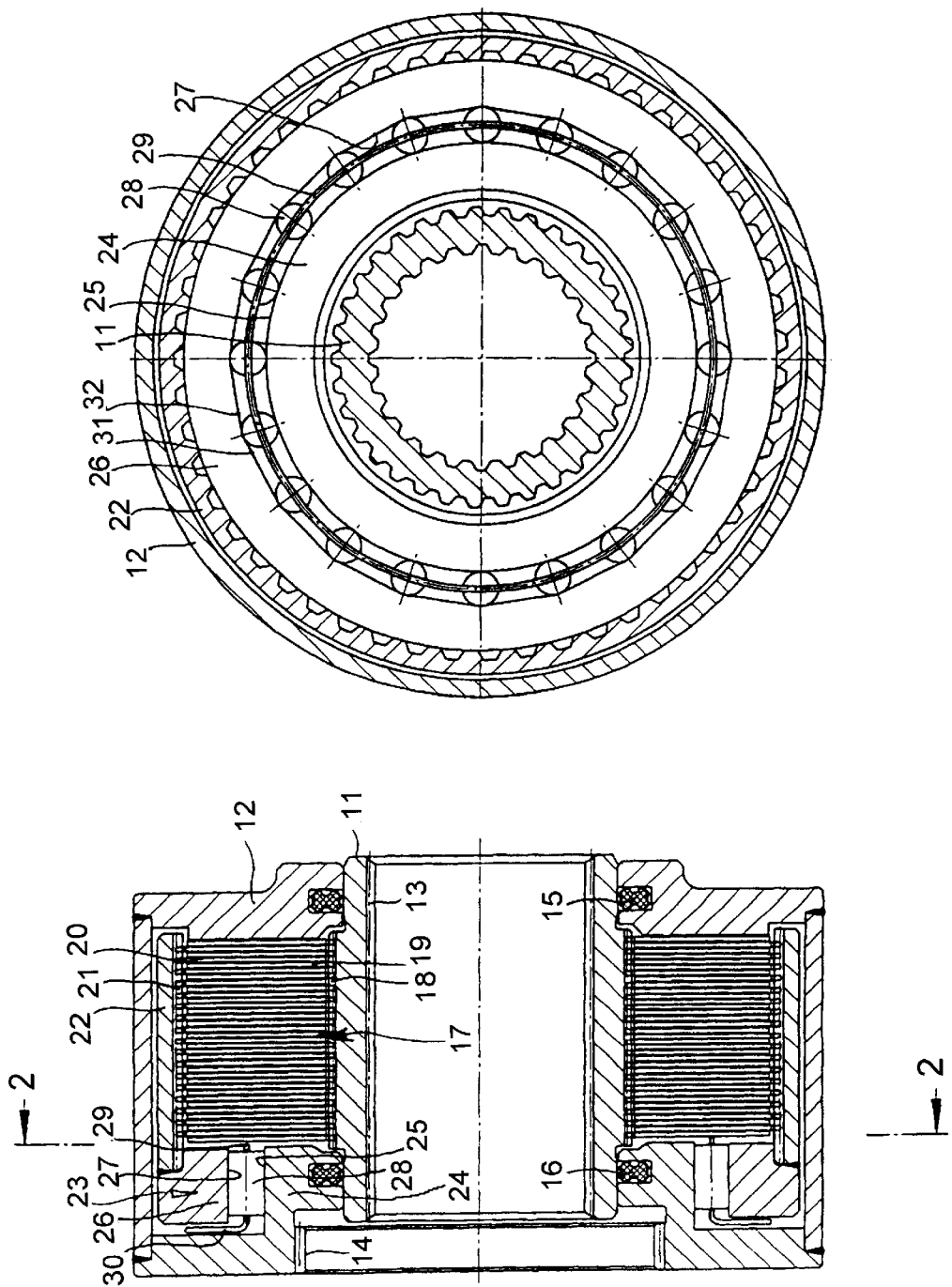
FIG. 1 shows a longitudinal section of a first embodiment of the applicant's inventive coupling.
FIG. 2 shows a cross-section of the first embodiment of the applicant's inventive coupling.

FIGS. 1 and 2 show a viscous coupling which comprises a hub 11 connectable to the input end in a driveline, and a housing 12 connectable to the output end in a driveline. For this purpose, the hub is provided with inner toothing 13 and the housing 12 consisting of several parts is provided with inner toothing 14. These two rotatable parts (11, 12) are sealed relative to one another by sliding seals 15, 16 to form an annular chamber 17. The hub 11 comprises an outer toothing 18 which holds first coupling plates 19 in a non-rotatable and axially floating way. In the longitudinal direction, there are provided second coupling plates 20 which alternate with the first coupling plates 19 and which are held in an inner toothing 21 of a plate carrier 22 in a non-rotatable and axially floating way. The plate carrier 22 can be coupled with the housing 12 by means of a freewheeling unit 23 which substantially consists of an inner ring 24 firmly connected to the housing 12 and having an outer annular face 25, of an outer ring 26 non-rotatably connected to the plate carrier 22 and having a ramp face 27, and of a plurality of circumferentially distributed locking members 28. The locking members are held in a cage 29 to which there is secured a brake plate 30 which is arranged in the vicinity and thus interacts with a radial wall of the housing 12. As can be seen in the cross-section, the face 25 of the ring 24 is entirely cylindrical, so that if there occurs a relative rotational movement of the housing 12 relative to the cage with the brake plate 30, no locking effect can be caused. On the other hand, at the ramp face 27, from both sides of the illustrated central position of the locking members 28, there are provided ramps 31, 32, so that in the case of a relative rotation of the plate carrier 22 relative to the cage 29 of the brake plate 30, the freewheeling assembly is blocked immediately. If the locking members 28 are circumferentially displaced, returning forces are generated relative to the ring 26 by means of springs (not illustrated in greater detail).

Figure 4:
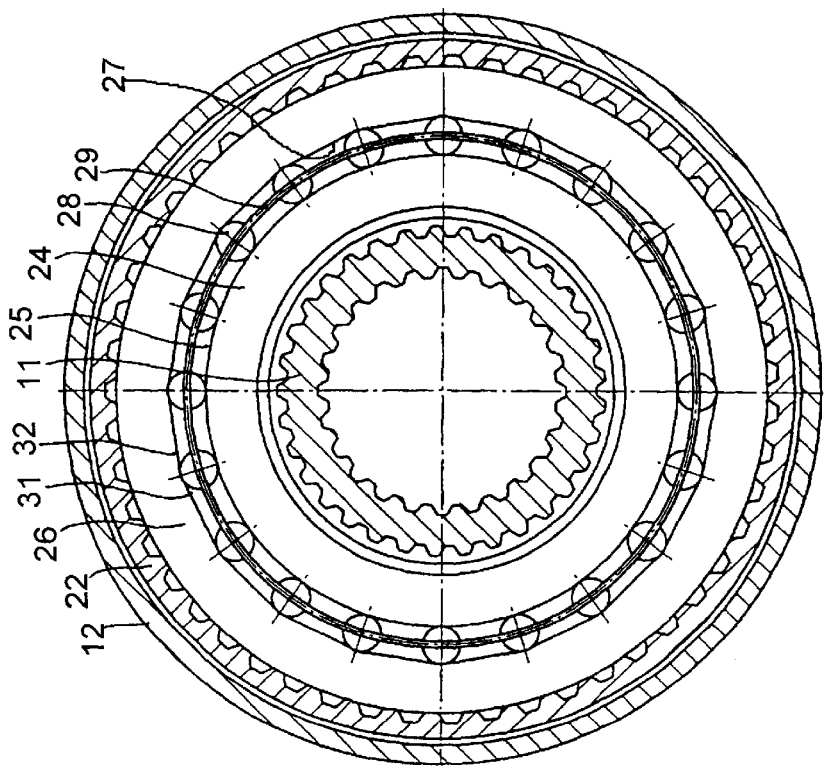
FIG. 4 shows a cross-section of the second embodiment of the applicant's inventive coupling.
Figure 3:
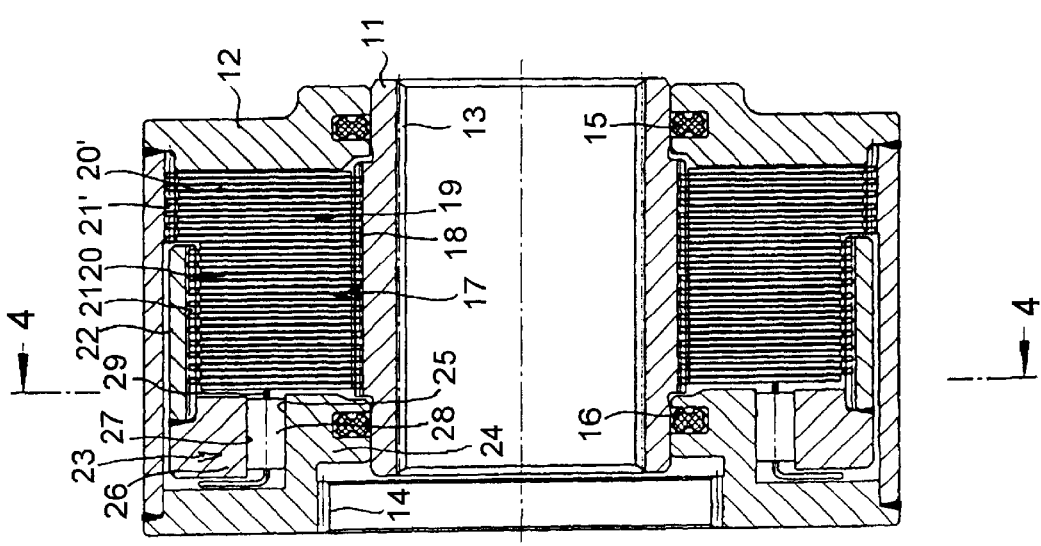
FIG. 3 shows a longitudinal section of a second embodiment of the applicant's inventive coupling.

FIGS. 3 and 4 shows a viscous coupling which comprises a hub 11 connectable to the input end in a driveline, and a housing 12 connectable to the output end in a driveline. For this purpose, the hub is provided with inner toothing 13 and the housing 12 consisting of several parts is provided with inner toothing 14. The two parts are sealed relative to one another by sliding seals 15, 16 and form an annular chamber 17. The hub 11 comprises an outer toothing 18 which hold first coupling plates 19 in a non-rotatable and axially floating way. In the longitudinal direction, there are provided second coupling plates 20 of a first set of plates which alternate with the first coupling plates 19 and which are held in an inner toothing 21 of a plate carrier 22 in a non-rotatable and axially floating way. Adjoining same and also alternating with the coupling plates 19, there are provided second coupling plates 20' of a second set of plates which are held in the inner toothing 21' of the housing 12 in a non-rotatable and axially floating way. The plate carrier 22 can be coupled to the housing 12 by means of a freewheeling assembly 23 which substantially consists of an inner ring 24 firmly connected to the housing 12 and having an outer annular face 25, of an outer ring 26 non-rotatably connected to the plate carrier 22 and having a ramp face 27 and of a plurality of circumferentially distributed locking members 28. The locking members are held in a cage 29 to which there is secured a brake plate 30 which is arranged in the vicinity and thus interacts with a radial wall of the housing 12. As can be seen in the cross-section, the face 25 of the ring 24 is entirely cylindrical, so that if there occurs a relative rotational movement of the housing 12 relative to the cage with the brake plate 30, no locking effect can be caused. On the other hand, at the ramp face 27, from both sides of the illustrated central position of the locking members 28, there are provided ramps 31, 32, so that in the case of a relative rotation of the plate carrier 22 relative to the cage 29 of the brake plate 30, the freewheeling assembly is blocked immediately. If the locking members 28 are circumferentially displaced, returning forces are generated relative to the ring 26 by means of springs (not illustrated in greater detail).

Certain modifications and variations of the disclosed embodiments of the present invention will be apparent to those skilled in the art. It should be understood that the disclosed embodiments are intended to be illustrative only, and not in any way restrictive of the scope of the invention as defined by the claims set forth hereunder.

I claim:

1. A viscous coupling having first and second rotatable parts (11, 12) in the form of a hub and a housing for the transmission of torque between said first and second rotatable parts (11, 12) caused by a positive speed differential between said first and said second of said rotatable parts (11, 12), which are supported inside one another, and are rotatable relative to one another around a common longitudinal axis (A), and which form a sealed annular chamber (17) which is filled with a highly viscous fluid in which are disposed first coupling plates (19) non-rotatably connected to said first rotatable part (11), and second coupling plates (20) non-rotatably connectable to said second rotatable part (12), said first and second coupling plates being arranged alternately in the longitudinal direction, and a freewheeling assembly (23) comprising two rings (24, 26) which, if torque flows in a first direction at a positive speed differential between said first rotatable part (11) and said second rotatable part (12), has a locking effect in both directions of rotation of said two rings (24, 26), at least above a relative rotational acceleration, and which, if torque flows in a second direction at a negative speed differential between said first and second rotatable parts (11, 12), has an unlocking effect in both directions of relative rotation of said first and second rotatable parts (11, 12), said freewheeling assembly being effective between a selected one (11) of said first and second rotatable parts (11, 12) and a plate carrier (22) which carries at least part of the coupling plates (20) of said selected one of said first and second rotatable parts (11, 12).

2. A viscous coupling according to claim 1, wherein said first rotatable part (11) is the hub, and said second rotatable part (12) is the housing.

3. A viscous coupling according to claim 1, wherein said freewheeling assembly (23) comprises locking members (28) between said two rings (24, 26), said locking members (28) being held in a cage (29) which is brakeable relative to said selected one (11) of said first and second rotatable parts (11, 12) and which, when braked, causes said freewheeling assembly to be blocked.

4. A viscous coupling according to either claim 1, 2 or 3, wherein said cage (29) is connected to a brake plate (30) which is positioned inside said sealed annular chamber (17) and which adjoins a radial wall of the other one (12) of said first and second rotatable parts (11, 12).

5. A viscous coupling according to either claim 1, 2, or 3, wherein said locking members (28) are each supported between spring means relative to said selected one (11) of said first and second rotatable parts (11, 12), said spring means being operative to set said locking members (28) to a central position relative to the said selected rotatable part (11), in which central position said freewheeling assembly (23) is released.

6. In a driveline of a vehicle with a permanently driven first axle and a second axle which is driven when required, the improvement comprising: a viscous coupling having first and second rotatable parts (11, 12) in the form of a hub and a housing for the transmission of torque between said first and second rotatable parts (11, 12) caused by a positive speed differential between said first and said second of said rotatable parts (11, 12), which are supported inside one another, and are rotatable relative to one another around a common longitudinal axis (A), said first and second rotatable parts (11, 12) being connected, respectively, to an input end and an output end in a driveline for the second axle; a sealed annular chamber (17) formed by said first and second rotatable parts (11, 12) and filled with a highly viscous fluid in which are disposed first coupling plates (19) non-rotatably connected to the first one of said rotatable parts, and second coupling plates (20) non-rotatably connected to the second one of the rotatable parts, said first and second coupling plates being arranged alternately in the longitudinal direction, the improvement comprising: a freewheeling assembly (23) comprising two rings (24, 26) which, if torque flows in a first direction at a positive speed differential between said first rotatable part (11) and said second rotatable part (12), has a locking effect in both directions of rotation of said rings (24, 26), at least above a relative rotational acceleration, and which, if torque flows in a second direction at a negative speed differential between said first and second rotatable parts (11, 12), has an unlocking effect in both directions of rotation of said rings (24, 26), said freewheeling assembly being effective between a selected one (11) of said first and second rotatable parts (11, 12) and a plate carrier (22) which carries at least part of the coupling plates (20) of said selected one of said first and second rotatable parts (11, 12), wherein said rotatable part (12) comprising the plate carrier (22) switchable via the freewheeling unit (23) is connected to the output end.

7. The improvement according to claim 6, wherein said freewheeling assembly (23) comprises locking members (28) between said two rings (24, 26), said locking members (28) being held in a cage (29) which is brakeable relative to said selected one (11) of said first and second rotatable parts (11, 12) and which, when braked, causes said freewheeling assembly to be blocked.

8. The improvement according to claim 7, wherein said cage (29) is connected to a brake plate (30) which is positioned inside said sealed annular chamber (17) and which adjoins a radial wall of the other one (12) of said first and second rotatable parts (11, 12).

9. The improvement according to claim 6, wherein said locking members (28) are each supported between spring means relative to said selected one (11) of said first and second rotatable parts (11, 12), which spring means sets said locking members (28) to a central position relative to said selected one (11) of said first and second rotatable parts (11, 12), in which central position said freewheeling assembly (23) is released.

10. A viscous coupling comprising:
(a) first and second rotatable parts (11, 12) in the form of a hub and a housing for the transmission of torque between said first and second rotatable parts (11, 12) caused by a positive speed differential between said first and said second of said rotatable parts (11, 12), which are supported inside one another, and which are rotatable relative to one another around a common longitudinal axis (A);

(b) an annular chamber (17) formed by said first and second rotatable parts (11, 12) and filled with a highly viscous fluid;

(c) first coupling plates (19) non-rotatably connected to one of said first and second rotatable parts (11, 12), and second coupling plates (20) non-rotatably connected to the other of said first and second rotatable parts (11, 12), said first and second coupling plates being arranged alternately in the longitudinal direction within said annular chamber; and (d) a freewheeling assembly (23) comprising two rings (24, 26) which, if torque flows in a first direction at a positive speed differential between said first rotatable part (11) and said second rotatable part (12), has a locking effect in both directions of rotation of said rings (24, 26), at least above a relative rotational acceleration, and which, if torque flows in a second direction at a negative speed differential between said first and second rotatable parts (11, 12), has an unlocking effect in both directions of rotation of said rings (24, 26), said freewheeling assembly being effective between a selected one (11) of said first and second rotatable parts (11, 12) and a plate carrier (22) which carries at least part of the coupling plates (20) of said selected one of said first and second rotatable parts (11, 12).

11. A viscous coupling according to claim 10, wherein said first rotatable part (11) is a hub, and said second rotatable part (12) is a housing.

12. A viscous coupling according to claim 10, wherein said freewheeling assembly (23) comprises locking members (28) between said two rings (24, 26), said locking members (28) being held in a cage (29) which is brakeable relative to said selected one (11) of first and second rotatable parts (11, 12) and which, when braked, causes said freewheeling assembly to be blocked.

13. A viscous coupling according to either claim 10, 11 or 12, wherein said cage (29) is connected to a brake plate (30) which is positioned inside said sealed annular chamber (17) and which adjoins a radial wall of the other one (12) of said first and second rotatable parts (11, 12).

14. A viscous coupling according to either claim 10, 11 or 12, wherein said locking members (28) are each supported between spring means relative to said selected one (11) of said first and second rotatable parts (11, 12), said spring means being operative to set said locking members (28) to a central position relative to said selected one (11) of said first and second rotatable parts (11, 12), in which central position the freewheeling assembly (23) is released.

* * * * *